United States Patent [19]

Seltzer et al.

[11] 4,414,611

[45] Nov. 8, 1983

[54] PORTABLE LIGHT

[75] Inventors: Samuel M. Seltzer; Saul Dennison, both of Livingston, N.J.

[73] Assignee: Allison Corporation, Livingston, N.J.

[21] Appl. No.: 441,677

[22] Filed: Nov. 15, 1982

[51] Int. Cl.³ .............................................. F21L 7/00
[52] U.S. Cl. ..................................... 362/183; 200/60; 362/20; 362/184; 362/191; 362/200; 362/249; 362/251; 362/254; 362/362; 362/368; 362/375; 362/802
[58] Field of Search .................. 200/60; 362/20, 183, 362/184, 191, 200, 249, 251, 254, 362, 368, 375, 362/802

[56] References Cited

U.S. PATENT DOCUMENTS

| | | | |
|---|---|---|---|
| 1,592,322 | 7/1926 | Adams | 362/20 |
| 2,389,762 | 11/1945 | Burke | 362/20 |
| 2,478,129 | 8/1949 | Powell | 362/20 |
| 3,125,300 | 3/1964 | Roche | 362/20 |
| 3,201,742 | 8/1965 | English | 362/183 |
| 3,222,513 | 12/1965 | DeFeo | 362/20 |
| 4,322,782 | 3/1982 | Wong | 362/183 |

*Primary Examiner*—Stephen J. Lechert, Jr.
*Attorney, Agent, or Firm*—Abraham Friedman

[57] ABSTRACT

A portable light having a housing which can be selectively mounted onto a support surface. A socket is supported on the housing and holds a bulb in a position externally visible from the housing. An externally manipulatable switch is provided on the housing. Within the housing there is provided circuit means including terminals having a first connecting section for connecting to an internal battery source and second connecting section for connecting to an external energy source. The various parts of the circuit are interconnected in series circuit relationship so that the switch operates the bulb.

10 Claims, 4 Drawing Figures

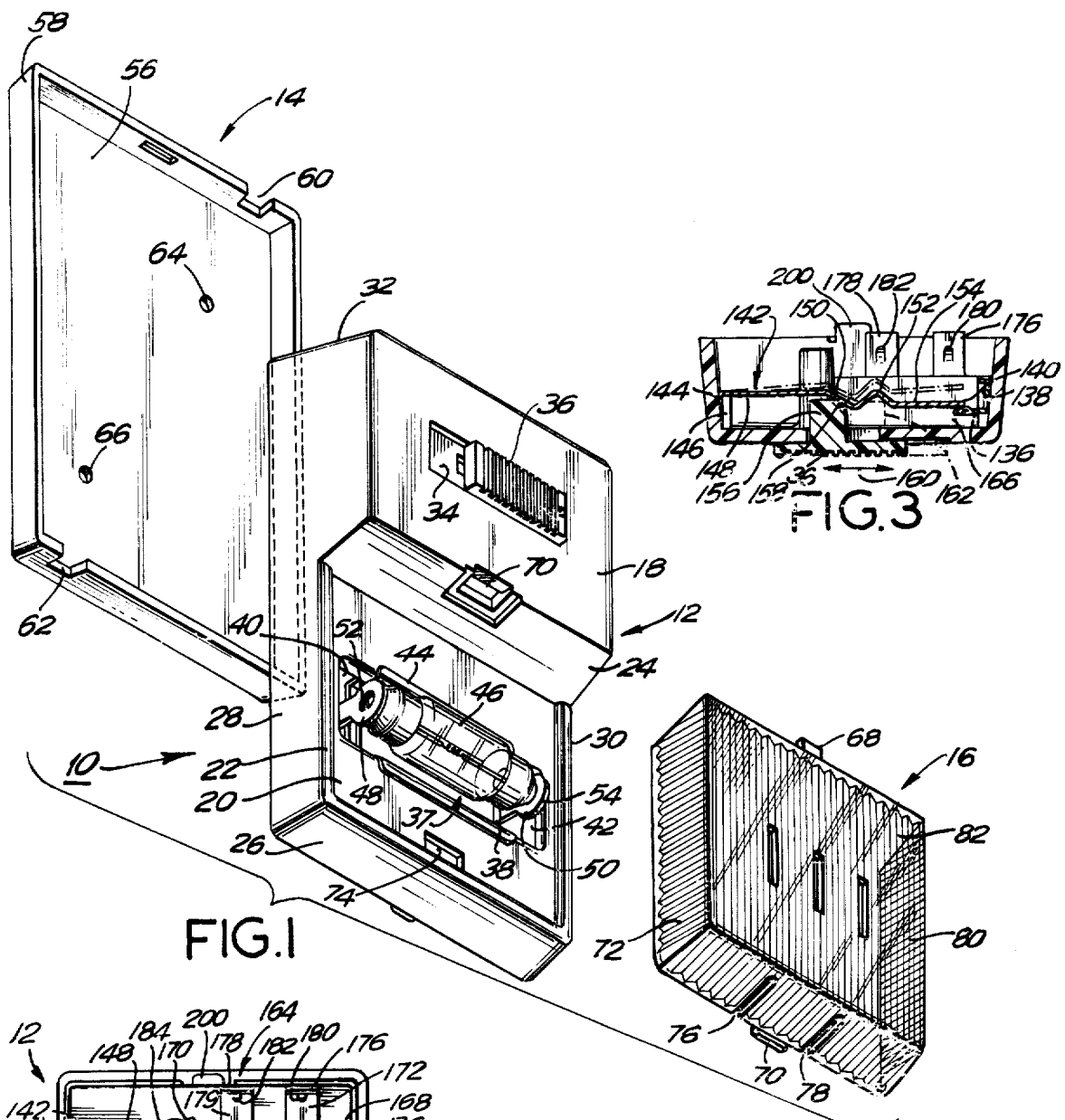
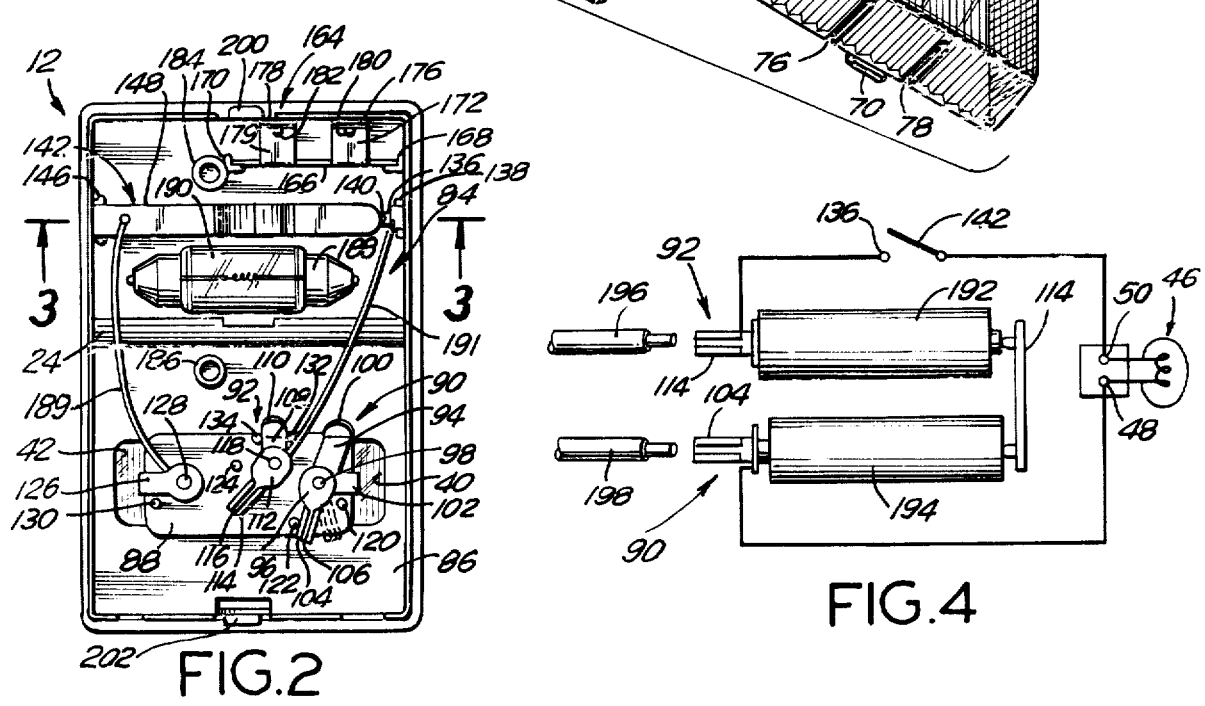

PORTABLE LIGHT

BACKGROUND OF THE INVENTION

This invention relates to a portable light, and more particularly to a light that can be selectively driven by either internal batteries or an external energy source, and which can be mounted, as desired, on a support surface.

Portable lighting is often needed for particular locations not equipped with permanent lights. The most common portable light is, of course, a flashlight. However, the flashlight is one that cannot normally be retained in a particular location for long term use. Frequently, it is desired to place a light at a location and keep it there for a considerable length of time.

For example, closets are often dark and it would be convenient to place a portable light in the closet for use whenever the closet is opened. Similarly in a car, it would be convenient to have a portable light mounted inside the car, in the truck, under the hood, or other locations, and selectively turned on whenever use is made of that area. While certain lighting devices are available which use internal batteries, these require continuous replacement of the batteries. In some situations, as for example when the light will be used in an automobile, it is not necessary to make continuous use of portable batteries since the availability of the automobile energy is present. For this reason, there are also provided specialized auto lights which can plug into a cigarette lighter receptacle of the automobile and thereby provide light in the car. However, these devices are then strictly limited to automobile use and cannot also be used inside homes, closets, cellars, and the like.

Accordingly, it would be convenient to have a portable light which can provide for use either in the home, auto, or street. The light should have the capability of being energized both by internal battery as well by external energy source such as an auto battery.

In order to achieve this desired result, various problems must be overcome. For example, the vehicle energy source has a considerably higher voltage than the usual portable battery. As a result, the bulb, or other illumination device being used may not be able to accommodate both voltage sources. Additionally, the type of terminal connections provided for internal batteries may not be suitable for connection to an external voltage source. Furthermore, the capabilities of mounting the light internally of a house may not be the same as required within a vehicle.

SUMMARY OF THE INVENTION

It is accordingly an object of the present invention to provide a portable light which avoids the aforementioned problems of prior art devices.

A further object of the present invention is to provide a portable light which can be utilized by means of either an internal battery source or an external voltage source.

Another object of the present invention is to provide a portable light which can be selectively mounted on a support surface and energized by means of an internal battery or a car battery.

Still another object of the present invention is to provide a portable light having internal terminals which can be connected to either an internal battery or an external voltage source, such as a car battery.

Briefly, in accordance with the present invention, there is provided a portable light having a housing which is adapted to be selectively mounted onto a support surface. A socket is supported on the housing for holding an illumination means in a position visible externally of the housing. A switch is provided which can be externally manipulated. Within the housing there is provided suitable circuits including terminals having a first section which can connect to an internal battery source and a second section which can be connected to an external energy source.

The socket, switch and internal circuit are all connected in a single series circuit path so as to energize the illumination means from either the internal battery or the external energy source.

In an embodiment of the invention, two illumination means are provided; one of which can be utilized in conjunction with an internal battery while the other is available for use with an external voltage source, such as energization from a vehicle. One of the illumination means can be stored internally of the housing while the other one is being utilized.

In an embodiment of the invention, the section of the connecting terminals which are utilized for connecting to the external energy source are pivotable so that they can be manipulated, as needed, in order to permit suitable connection to wires extending from the external voltage source.

The aforementioned objects, features and advantages of the invention will, in part, be pointed out with particularity and will, in part, become obvious from the following more detailed description of the invention, taken in conjunction with the accompanying drawings, which forms an integral part thereof.

BRIEF DESCRIPTION OF THE DRAWING

In the drawing:

FIG. 1 is an exploded perspective view of the various parts forming the portable light of the present invention;

FIG. 2 is an elevational rear view of the housing, and revealing the various internal circuit connections;

FIG. 3 is a cross sectional view taken along line 3—3 of FIG. 2 and,

FIG. 4 is a schematic wiring diagram of the circuit of the present invention.

In the various figures of the drawing, like reference characters designate like parts.

DESCRIPTION OF THE PREFERRED EMBODIMENT

Referring now to FIG. 1, the portable light of the present invention is shown generally at 10 and comprises a main housing section 12 having a removable back 14 and a removable upper transparent cover 16. The housing 12 is formed of a stepped construction having an upper section 18 and a lower section 20. A slightly raised edge 22 is peripheraly formed about the lower section 20. The upper section 18 is joined to the lower section 20 by means of a rearwardly angled wall 24. The peripheral housing walls include a front wall 26, side walls 28 and 30, and a rear wall 32. All of the peripheral walls are outwardly flared.

A recess 34 is formed in the upper section 18 and a rectangular opening is formed within a part of the recess. A thumbnail lever 36 is slidable along the recess 34 and serves as a main ON/OFF switch.

A recessed chamber 37 is formed in the lower section 20 and is defined by a base wall 38. Laterally on either side of the base wall 38 are openings 40, 42 extending to the interior of the housing. A reflective surface, such as an aluminum plate 44, is formed in the recessed chamber and sits on the base wall 38. An illumination means, such as the elongated bulb 46, is retained in the recessed chamber by means of opposing socket terminals 48 and 50. The socket terminals 48 and 50 serve as both electrical connectors as well as mechanical supports for the bulb. Axial holes 52 and 54 respectively formed in the terminals 48 and 50 accommodate nipples extending from the ends of the bulbs and thereby hold the bulb in place. The terminals 48 and 50 are formed of spring leaf material so that they can spread apart to easily replace the bulb 46. The reflector surface 44 behind the bulb 46 provides for increased radiation of the illumination forward of the housing.

The base 14 is formed of a rear wall 56 with outwardly flared peripheral side walls 58. Diagonally opposing notches 60, 62 are formed in the top and bottom peripheral side wall for passage of wires into the housing from an external source, such as a car battery. Apertures 64 and 66 in the rear wall 56 are available for attachment to a support surface by means of screws, and the like. Alternately, adhesive tape can be placed on the rear of the base 14 so that the device can be adhered onto any support surface.

The upper cover 16 is formed of transparent or translucent material. It is shaped to matingly fit onto the lower section 18 of the housing to complete a substantially rectangular configuration to the portable light itself.

The upper cover 16 is retained in place by means of a laterally extending tab 68 which fits into a corresponding slot 70 provided in the interconnecting wall 24 of the housing. A tab 70 downwardly extending from the skirt portion 72 of the upper cover 16 can lock into place in a receiving slot 74 provided on the bottom edge of lower section 18 of the housing. Lateral slits 76, 78 on either side of the tab 70 facilitate depressions of the tab 70 so that it can sit into and bend out of the slot 74.

The upper surface 80 of the upper cover 16 can be clear or, as shown, can include the ribs 82 for diffusing the light and thereby avoiding a glaring effect from the light bulb.

Referring now to FIG. 2, the housing unit 12 encloses an internal compartment having a top section 84 and a bottom section 86 corresponding to the upper and lower stepped portions on the front of the housing. On the bottom section 86 the obverse surface 88 of the chamber wall 38 supports a first connecting terminal 90 and a second connecting terminal 92. The connecting terminal 90 has a first section 94 pivotally coupled to a second section 96 by means of a pivot pin 98 passing into the wall 88. The first section 94 abuts the wall 88 and terminates at its distal end in a rearwardly directed vertical section 100 which serves as a retaining contact for a battery. First section 94 also includes an L-shaped member 102 having one leg lying against the surface 88 and a second leg which extends forwardly forming the terminal 48 which is one side of the socket.

The second section 96 of the connecting terminal 90 is available for interconnecting to an external wire source and includes a sleeve 104 terminating an opposing pair of walls separated by a channel 106 permitting the sleeve to be spread apart so as to accommodate wires extending from an external source.

The second connecting terminal 92 also includes a first section 108 which lies against the wall 88 and includes a vertically extending tab 110 serving as a retaining contact for a battery. A second section 112 of connecting terminal 92 also includes the sleeve portion 114 with an open channel 116 to accommodate connector from an external source. The two sections 108, 112 are interconnected by means of a pivot pin 118 which extends into the wall 88.

The sections 96, 112, are therefore free to pivot. However the pivoting of terminal 96 is limited by pins 120 and 122, while the pivoting of the section 112 is limited by the pins 122 and 124. These pins are so arranged so as to prevent wires connected to the sleeves from contacting each other. Nevertheless, because of the available pivoting, interconnections from an external source becomes easier.

Also positioned on the wall 88 is an additional L-shaped terminal 126 which is secured into the wall 88 by means of pivot pin 128. Terminal 126 extends through lateral chamber 42 and becomes the other terminal 50 of the socket shown in FIG. 1. Pivoting of this member is limited by means of the pin 130. Similarly, pins 132 and 134 are available on either side of the tab 110 to limit its movement.

The particular pivots 98, 118, 128 can all be rivets which extend into the wall 88. The top of the rivets are covered by means of the reflector 44 to avoid marring the asthetic appearance of the upper surface of the housing.

Within the top section there is provided a switch which can best be seen in FIGS. 2 and 3. The switch includes an L-shaped contact member 136 secured to a side wall by means of the channel 138. The L-shaped contact member 136 has one leg cantelevered and includes an upwardly extending protrusion 140 on its top surface to ensure proper contact.

Extending from the opposing side wall is an elongated cantelevered member 142. One end adjacent the wall is downwardly bent at 144 and is secured against the side wall by means of the channel 146.

The cantelevered member 142 includes a first elongated section 148, followed by a downwardly extending V-shaped cam section 150, continuing into an upwardly shaped V cam section 152, and terminating in a laterally extending horizontal section 154. The section 154 is positioned so as to terminate at approximately the protrusion 140 on the contact 146.

The slidable thumbnail lever 36, as was shown in FIG. 1, includes an upwardly extending finger portion 156 having a cam follower surface 158 at its top edge. With the lever 36 positioned in its left most position, the cam follower surface 158 is on the left side of the downwardly directed V-shaped cam surface 150 permitting the cantelevered member 142 to contact protrusion 140 on terminal 136. Moving of the lever 36 to the right, as shown by the arrow 160, moves the cam follower surface 158 to the right as shown by the dotted lines 162. In this position the finger 156 is adjacent the upwardly directed V-shaped cam surface 152 to push the cantelevered member 142 into its upward position as shown in the dotted lines. In this upward position, it is disconnected from the contact 136.

The internal batteries are retained in place and contacted by means of the rear terminal connector assembly 164, comprising the lower wall section 166 held in place by means of the retaining posts 168, 170 on either side thereof. The connector assembly 164 continues upwardly into the horizontal seats 172 and 174, and then continues upwardly into the vertical terminals 176, 178. Contact protrusions 180, 182 are respectively struck from the members 176, 178 to provide for a spring contact with the internal batteries.

One internal battery is positioned between the vertical tab 100 and the terminal 176. It is physically retained in place by means of the seat portion 172 and the wall 86. A second battery is held and electrically connected between the tab 110 and terminal 178, and is retained in place by means of the seat portion 174 and the wall 86. Laterally, one battery is held by means of the sidewall of the housing, and the other battery is held by means of the circular positioning post 184, 186. As a result, the batteries will have no chance of sliding.

An extra bulb 188 is held within the upper section 84. The bulb 188 can be wrapped by means of a wrapping 190 to prevent it from breaking. Alternately, a suitable clamp can be provided to keep it in place.

The electrical circuit interconnections internally of the device can best be seen with regard to FIG. 2. One electric wire 191 is interconnected between the connector 92 and the contact 136. A second wire 189 is interconnected between the cantelevered member 142 and the terminal section 126.

Schematically, as shown in FIG. 4, a complete electrical circuit is provided between the various terminals, switches, and sockets so as to produce a closed circuit. More specifically, two "AA" batteries 192, 194 are respectively retained between the various terminals. Battery 192 is held between the terminal 92 and the support terminal 164 while the other battery 194 is held in a reversed manner between the terminal 90 and the terminal support plate 164. The two batteries are thereby connected in series. The terminal 92 is connected to the contact 136. The switch 142 can close onto that contact 136. The switch 142 is connected to one socket connection 50 of the lamp socket. The other lamp socket connection 48 is connected to the contact terminal 90.

Should it be desired to utilize an external energy source, such as the battery from an automobile, the internal batteries 192, 194 are removed. In their place, wires 196, 198 from a car battery are inserted into the sleeves 114 and 104. These wires can then pass out of the housing by means of the notches 60, 62 in the base 14 covering the back of the housing. The back 14 is held in place by means of the tabs 200, 202 on the housing section 12, as shown in FIG. 2.

When internal batteries 192, 194 are utilized, the bulb 46 is utilized since the voltage of that bulb is typically able to carry three volts, which is the volts provided by means of the two internal batteries 192, 194. When it is desired to utilize an external voltage source, such as from a vehicle, the internal batteries are removed and the wires from the voltage source are attached as shown at 196, 198. The bulb 46 is then removed and the extra stored bulb 188 is utilized. This extra bulb 188 is designed to operate with 12 volts, which is the typical voltage of a car battery.

There has been disclosed heretofore the best embodiment of the invention presently contemplated. However, it is to be understood that various changes and modifications may be made thereto without departing from the spirit of the invention.

I claim:

1. A portable light, comprising:

a housing adapted to be selectively mounted on a support surface;

a single socket means supported on said housing for holding an illumination means in a position visible externally of said housing;

externally manipulatable switch means on said housing and;

circuit means contained within said housing, said circuit means comprising two terminal means each having a first connecting section for selectively connecting to an internal battery source, and a second connecting section for selectively connecting to an external energy source, and a common series circuit path serially interconnecting said single socket, said switch means and said circuit means, whereby said illumination means can be selectively energized by the internal battery source or the external energy source.

2. A portable light as in claim 1, and comprising pivot means for pivotally interconnecting said respective first and second connecting sections of each terminal means while maintaining electrical connection therebetween, whereby said second connecting section can pivotally move to facilitate connection to external leads from the external source which leads extend into said housing.

3. A portable light as in claim 2, wherein said second connecting section comprises a pair of contact terminals, and limit means for limiting the extent of said pivotal movement to thereby prevent electrical connection between said pair of contact terminals.

4. A portable light as in claim 2, wherein said first connecting section comprises a L-shaped member, one leg of which forms a contact terminal for an internal battery, the other leg of which forms one side connection of said socket means.

5. A portable light as in claim 4, wherein said first and second connecting sections of each terminal means each comprise a pair of contact terminals, coupling means for electrically interconnecting said corresponding ones of said two pairs of contact terminals, one contact terminal of of said first connecting section forming said L-shaped member, the other contact terminal of said first connecting section being electrically coupled to one side of said switch means, the other side of said switch means being electrically connected to the other side connection of said socket means.

6. A portable light as in claim 5, wherein said housing encloses an internal compartment, a recessed chamber formed on said housing, lateral openings on said recessed chamber for communication with said internal compartment, said circuit means positioned in said internal compartment, said other leg of said L-shaped member extending through one lateral opening into said recessed chamber, and further comprising an L-shaped connector, one leg of which is secured in said internal compartment for connection to said other side of said switch means, the other leg of which extends through the other lateral opening into said recessed chamber, whereby said socket means is defined within said recessed chamber between said lateral openings.

7. A portable light as in claim 6, wherein said housing is of a stepped construction having upper and lower sections, said recessed chamber being formed on said lower section, and comprising a removable transparent cover over said lower section.

8. A portable light as in claim 7, wherein said switch means comprises a contact terminal extending from one side of said housing, a spring leaf metal arm cantelevered from an opposing side of said housing and biased toward said contact terminal, and a sliding actuating lever including a thumbnail operating portion extending externally of said housing, said lever movable between an interrupting position and a contact position.

9. A portable light as in claim 8, wherein said spring leaf metal comprises a V-shaped cam surface, and said actuating lever comprises a cam follower surface slidable by means of said thumbnail operating portion, said interrupting position being defined by the sliding of said cam follower adjacent the apex of said V-shaped cam surface.

10. A portable light as in claim 6, and further comprising storage section within said internal compartment for storing a bulb for higher voltage usage.

* * * * *